United States Patent
Tillman et al.

(10) Patent No.: US 10,564,954 B2
(45) Date of Patent: Feb. 18, 2020

(54) HYBRID ELECTRIC VEHICLE WITH AUTOMATED SOFTWARE UPDATE SYSTEM

(71) Applicant: FORD GLOBAL TECHNOLOGIES, LLC, Dearborn, MI (US)

(72) Inventors: Brian David Tillman, Dearborn, MI (US); Medville Jay Throop, Ann Arbor, MI (US); Ylldes Zeneli, Bloomfield Hills, MI (US); Karl Nathan Clark, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 15/730,651

(22) Filed: Oct. 11, 2017

(65) Prior Publication Data

US 2019/0108010 A1    Apr. 11, 2019

(51) Int. Cl.
  *G06F 8/65*     (2018.01)
  *B60L 58/12*    (2019.01)
  *G06F 8/654*    (2018.01)
  *H04L 29/08*    (2006.01)
  *G07C 5/00*     (2006.01)

(52) U.S. Cl.
  CPC .............. *G06F 8/65* (2013.01); *B60L 58/12* (2019.02); *G06F 8/654* (2018.02); *G07C 5/008* (2013.01); *H04L 67/12* (2013.01); *H04L 67/34* (2013.01); *B60W 2550/40* (2013.01)

(58) Field of Classification Search
  None
  See application file for complete search history.

(56) References Cited

U.S. PATENT DOCUMENTS

| 8,655,541 | B2* | 2/2014 | You | H04L 67/34 701/29.1 |
| 2005/0256614 | A1* | 11/2005 | Habermas | G06F 8/65 701/1 |
| 2007/0185624 | A1* | 8/2007 | Duddles | G06F 8/654 701/1 |
| 2013/0031540 | A1* | 1/2013 | Throop | G06F 8/654 717/173 |

(Continued)

*Primary Examiner* — Philip Wang
*Assistant Examiner* — Rongfa P Wang
(74) *Attorney, Agent, or Firm* — Michael Spenner; Brooks Kushman P.C.

(57) ABSTRACT

A vehicle includes an onboard controller(s) coupled to a wireless transceiver, which are configured to connect to a remote server, and to respond to a remote software update message for a vehicle from the remote server(s). In response, the controller(s) download a software update to the vehicle from the remote server(s). The controller(s) are further configured to detect a vehicle idle state, to determine whether the vehicle is unattended, such that the software update may proceed. If the idle state is detected, and in response to the remote software update message, the controller(s) configure the vehicle to a program mode, having vehicle conditions that include key on, transmission in park, and engine off. If the program mode configurations are successful, then the controller(s) update and/or flash the downloaded updates to in-vehicle, onboard computer processing systems and controller(s), which may include for example an engine control unit (ECU), among others.

20 Claims, 2 Drawing Sheets

(56) References Cited

U.S. PATENT DOCUMENTS

| | | | | |
|---|---|---|---|---|
| 2014/0282467 A1* | 9/2014 | Mueller | ............... | G06F 8/66 |
| | | | | 717/170 |
| 2015/0128123 A1* | 5/2015 | Eling | ............... | G06F 8/654 |
| | | | | 717/171 |
| 2015/0277890 A1* | 10/2015 | Throop | ............... | B60L 58/13 |
| | | | | 717/172 |
| 2015/0329120 A1* | 11/2015 | Fujisawa | ............... | G08G 1/20 |
| | | | | 701/123 |
| 2016/0266886 A1* | 9/2016 | Sarkar | ............... | G06F 8/65 |
| 2018/0047219 A1* | 2/2018 | Buswell | ............... | G07C 5/008 |
| 2018/0108186 A1* | 4/2018 | Lin | ............... | G06F 8/65 |
| 2018/0275983 A1* | 9/2018 | Kwon | ............... | H04W 4/50 |

\* cited by examiner

HYBRID ELECTRIC VEHICLE WITH AUTOMATED SOFTWARE UPDATE SYSTEM

TECHNICAL FIELD

The disclosure relates to electric or hybrid electric vehicles configured with automated, remote, pre-flash program configuration, and unattended in-vehicle software update technology.

BACKGROUND

Vehicle manufacturers have developed various types of in-vehicle and/or onboard computer processing systems that sometimes require software updates. In the past, such software updates have required manual operation of the in-vehicle computer processing systems by a technician to configure the vehicle into a program mode, and to manually perform and confirm success of the software updates. When large numbers of vehicles in a fleet require software updates, the process can become time consuming and costly, which can be compounded if errors occur during the manual update operations. With advances in such vehicle computer processing systems being utilized in newer electric and hybrid electric vehicles, which can benefit from sometime more frequent software updates, the need for more automated software update capabilities has become more pronounced.

SUMMARY

Many types of personal, commercial, and industrial vehicles, including combustion engine and hybrid, plug-in hybrid, and battery electric vehicles, hereafter collectively referred to as "vehicles," include several types of in-vehicle computing systems, controllers, interfaces, networks, communications capabilities, and applications, which enable vehicle operation, as well as onboard and in-vehicle control of new and improved propulsion and electric drive systems, vehicle to vehicle and vehicle to infrastructure communications, and related communications capabilities, and control and exchange of data, including remotely initiated, in-vehicle software updates to these in-vehicle systems.

The disclosure is directed to electric or hybrid electric vehicles configured with automated, remote, and unattended in-vehicle processing system software update capabilities, which are also referred to by those knowledgeable in the field of technology as software flash/update capabilities. The new automated, remotely initiated and controlled, and unattended update capabilities further utilize new technology for improved in-vehicle pre-flash, program configuration of the vehicle before updating. Previously, vehicles that required software updates, required an in-vehicle technician or operator to initiate the flash procedure by manually reconfiguring the vehicle to be in park, with the engine off, and with the ignition key on, among other requirements.

The new technology of the disclosure enables remote, wireless, and unattended vehicle software scanning to detect vehicles requiring software updates. The new system also enables scheduling of automated updates of fleet vehicles during predetermined times such as non-business hours, and when such vehicles are unattended and not in operation. Further, the innovation enables an automated vehicle program mode configuration, using for example the Ford SYNC system, which is configured according to the disclosure to remotely and electronically reconfigure the vehicle to be in park, to have the engine off, and to enable the ignition key to be on. In further modifications, the new system also enables detection of a sufficient state of charge (SoC) for electric and hybrid electric vehicles, and can start the internal combustion engine to charge the vehicle if needed, and can then initiate the software update once a sufficient SoC is attained.

The disclosure is directed to a vehicle that includes at least one and/or one or more onboard controller(s) coupled to a wireless transceiver, which are configured to connect to a remote server or servers, and to respond to a remote software update message for the vehicle from the remote server(s). In response to the message indicating available software updates, the controller(s) download a software update to the vehicle from the remote server(s). Before updating the in-vehicle software, the controller(s) are further configured to detect a vehicle idle state, to ensure the vehicle is unattended and not in use, such that the software update may proceed without interruption. In typical configurations, such an idle state includes vehicle 100 powered off and parked, and with its various components, systems, and devices in an unpowered, non-operational, and/or unused condition. If the idle state is detected, and in response to the remote software update message, the controller(s) configure the vehicle to a program mode, to automatically and electronically enable vehicle conditions that include key on, transmission in park, and engine off.

If these program mode configurations are successful, then the controller(s) update and/or flash the downloaded updates to in-vehicle, onboard computer processing systems, such as the controller(s) and other processing systems, and which may also include for example an engine control unit (ECU), among others. Once complete, the flashed software is verified against the downloaded software update to detect errors. If errors are detected, then reupdate and/or reflash may be attempted before the targeted controller(s) and processing and computing systems is/are reverted to an original state, and an error condition is generated and communicated. If errors are not detected in the flashed software, then the update and/or flash procedure is terminated, and the controller(s) terminate the program mode, and command a key off condition.

In variations, the onboard controller(s) are also coupled to a networked communications device that includes the transceiver, and is/are further configured to periodically connect to the remote server(s), and to receive a software version request from the remote server(s). In response, the onboard controller(s) are configured to generate reply to the server that includes a software version list for in-vehicle software.

The onboard controller(s) are further adapted to receive from the remote server(s), the remote software update message, which includes at least one of and/or one or more of software update authentication data and/or an updated software version list. The controller(s) verify the downloaded software update according to the authentication data and/or the updated software version list. If verification fails, the controller(s) are configured to attempt to redownload the software update, and in response to successful verification, to configure the vehicle to the program mode to enable the update.

In further arrangement of the disclosure, the onboard controller(s) are also configured to respond to detecting a current time to be within a predetermined update schedule, which proscribes time periods during which the vehicle is available to update and/or flash the downloaded software. Responsive to detecting vehicle availability for software updates, the controller(s) can configure the vehicle to the program mode to initiate the update. Otherwise, in response to detecting unavailability, the controller(s) are adapted to generate a pending update message, which can be communicated to one or more of the remote server(s), an in-vehicle messaging system and user interface, and/or another destination. In further variations, the onboard controller(s) are also configured to monitor the current time until detecting a time within the predetermined update schedule.

In additional configurations of the disclosure, the onboard controller(s) are also coupled to a battery, and further configured to detect a battery state of charge (SoC) that exceeds a flash charge limit. When sufficient SoC exists to enable the onboard controller(s) to complete the software update, the controller(s) are adapted to configure the vehicle to the program mode. Otherwise, upon detecting a recharge permission, the onboard controller(s) configure the vehicle to the program mode, but with an engine on condition, such that the battery is recharged until the SoC exceeds the flash charge limit.

The onboard controller(s) also are configured in other arrangements, responsive to verification of the software update, termination of the program mode, and the key off condition, to communicate an update status to one or more of the remote server(s) and to a user interface of the vehicle. The disclosure is also directed to adaptations of the onboard controller(s) that enable an on-demand update capability, which controller(s) are further coupled to a vehicle interface such as, for example without limitation, a graphical user interface, also and configured to generate and communicate an update inquiry to the remote server, in response to an input from the graphical user interface, and to receive in response to the inquiry, the remote software update message for the vehicle. In still other modifications, the onboard controller(s) are adapted to respond to a vehicle and/or user interaction signal, which may include a user attempting to start or otherwise utilize the vehicle during the program condition and/or update process, and to generate at least one of a program mode alert message to the graphical user interface and/or an audiovisual alert to annunciate the configured program mode and continuing update process.

This summary of the implementations and configurations of the vehicles and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
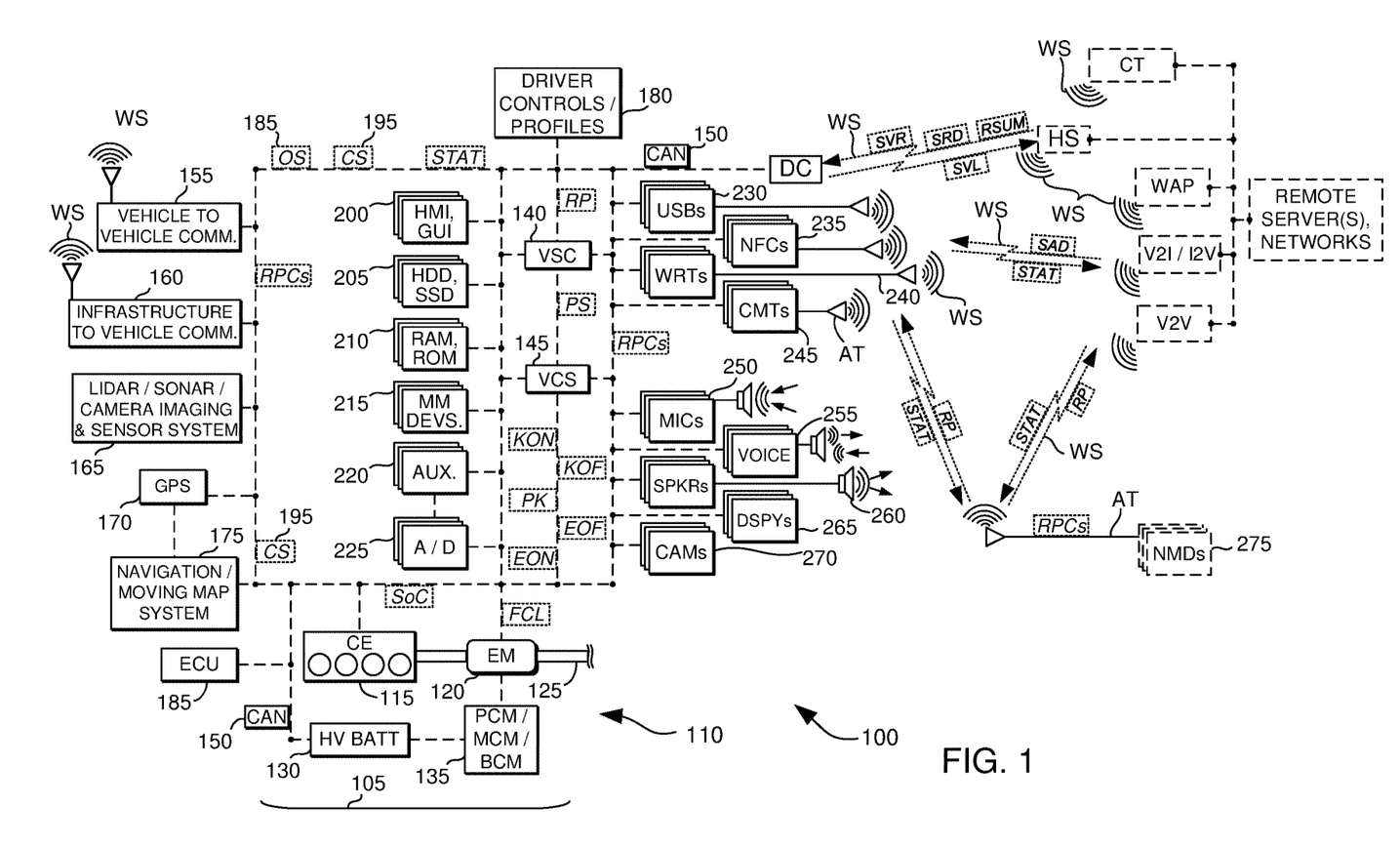
FIG. 1 is an illustration of a vehicle and its systems, controllers, components, sensors, actuators, and methods of operation.
Figure 2:
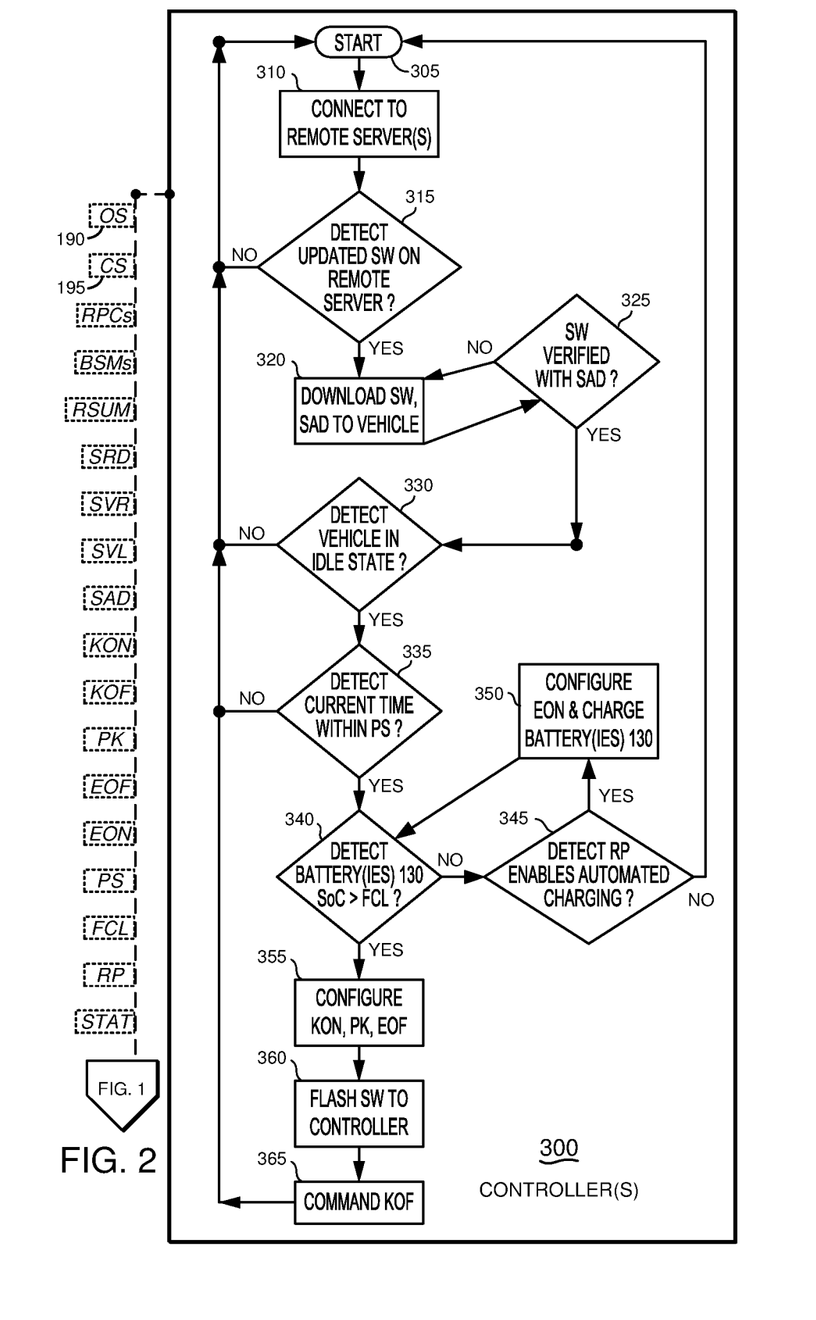
FIG. 2 illustrates certain aspects of the disclosure depicted in FIG. 1, with components removed, added, and/or rearranged for purposes of illustration.

With reference now to the various figures and illustrations and to FIGS. 1 and 2, and specifically to FIG. 1, a schematic diagram of a conventional petrochemical-powered and/or hybrid electric vehicle 100 is shown, which vehicles may in further examples also include a battery electric vehicle, a plug-in hybrid electric vehicle, and combinations and modifications thereof, which are herein collectively referred to as a "vehicle" or "vehicles." FIG. 1 illustrates representative relationships among components of vehicle 100. Physical placement and orientation, and functional and logical connections and interrelationships of the components within vehicle 100 may vary. Vehicle 100 includes a driveline 105 that has a powertrain 110, which includes one or more of a combustion engine (CE) 115 and an electric machine or electric motor/generator/starter (EM) 120, which generate power and torque to propel vehicle 100.

Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices. EM 120 may be any one of a plurality of types of electric machines, and for example may be a permanent magnet synchronous motor, electrical power generator, and engine starter 120. CE 115 and EM 120 are configured to propel vehicle 100 via a drive shaft 125 and in cooperation with various related components that may also further include a transmission, clutch(es), differentials, a braking system, wheels, and the like.

Powertrain 110 and/or driveline 105 further include one or more batteries 130. One or more such batteries can be a higher voltage, direct current battery or batteries 130 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 130 operating in the range of between about 6 and 24 volts or more or less, which is/are used to store and supply power for other vehicle components and accessories.

A battery or batteries 130, are respectively coupled to engine 115, EM 120, and vehicle 100, as depicted in FIG. 1, through various mechanical and electrical interfaces and vehicle controllers, as described elsewhere herein. High voltage EM battery 130 is also coupled to EM 120 by one or more of a power train control module (PCM), a motor control module (MCM), a battery control module (BCM), and/or power electronics 135, which are configured to convert and condition direct current (DC) power provided by high voltage (HV) battery 130 for EM 120.

PCM/MCM/BCM/power electronics 135 are also configured to condition, invert, and transform DC battery power into three phase alternating current (AC) as is typically required to power electric machine or EM 120. PCM/MCM/BCM 135/power electronics is also configured to charge one or more batteries 130, with energy generated by EM 120 and/or front end accessory drive components, and to receive, store, and supply power from and to other vehicle components as needed.

With continued reference to FIG. 1, vehicle 100 further includes one or more controllers and computing modules and systems, in addition to PCM/MCM/BCM/power electronics 135, which enable a variety of vehicle capabilities. For example, vehicle 100 may incorporate a body control module (BCM) that is a stand-alone unit and/or that may be incorporated as part of a vehicle system controller (VSC) 140 and a vehicle computing system (VCS) and controller 145, which are in communication with PCM/MCM/BCM 135, and other controllers. For example, in some configurations for purposes of example but not limitation, VSC 140 and/or VCS 145 is and/or incorporates the SYNC.™., APPLINK.™., MyFord Touch.™. and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices.

For further examples, but not for purposes of limitation, at least one of and/or one or more of the controller(s) such as VSC 140 and VCS 145, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a media player (MP3, Blu-Ray.™., DVD, CD, cassette tape, etc.), stereo, FM/AM/satellite radio receiver, and the like, as well as a human machine interface (HMI) and/or display unit as described elsewhere herein.

Such contemplated components and systems are available from various sources, and are for purposes of example manufactured by and/or available from the SmartDeviceLink Consortium, the OpenXC project, the Ford Motor Company, and others (See, for example, SmartDeviceLink-.com, openXCplatform.com, www.ford.com, U.S. Pat. Nos. 9,080,668, 9,042,824, 9,092,309, 9,141,583, 9,141,583, 9,680,934, and others).

In further examples, SmartLinkDevice (SDL), OpenXC, and SYNC.™. AppLink.™. are each examples that enable at least one of and/or one or more of the controller(s) such as VSC 140 and VCS 145, to communicate remote procedure calls (RPCs) utilizing application programming interfaces (APIs) that enable command and control of external or off-board mobile devices and applications, by utilizing in-vehicle or onboard HMIs, such as graphical user interfaces (GUIs) and other input and output devices, which also include the hardware and software controls, buttons, and/or switches, as well as steering wheel controls and buttons (SWCs), instrument cluster and panel hardware and software buttons and switches, among other controls. Exemplary systems such as SDL, OpenXC, and/or AppLink.™. enable functionality of the mobile device to be available and enabled utilizing the HMI of vehicle 100 such as SWCs and GUIs, and also may include utilization of onboard or in-vehicle automated recognition and processing of voice commands.

Controller(s) of vehicle 100 such as VSC 140 and VCS 145, include and are coupled with one or more high speed, medium speed, and low speed vehicle networks, that include among others, a multiplexed, broadcast controller area network (CAN) 150, and a larger vehicle control system and other vehicle networks that may and/or may not require a host processor, controller, and/or server, and which may further include for additional examples, other micro-processor-based controllers as described elsewhere herein. CAN 150 may also include network controllers and routers, in addition to communications links between controllers, sensors, actuators, routers, in-vehicle systems and components, and off-board systems and components external to vehicle 100.

Such CANs 150 are known to those skilled in the technology and are described in more detail by various industry standards, which include for example, among others, Society of Automotive Engineers International.™. (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

CAN 150 contemplates the vehicle 100 having one, two, three, or more such networks running at varying low, medium, and high speeds that for example nay range from about 50 kilobits per second (Kbps) to about 500 Kbps or higher. CAN 150 may also include, incorporate, and/or be coupled to and in communication with internal, onboard and external wired and wireless personal area networks (PANs), local area networks (LANs), vehicle area networks (VANs), wide area networks (WANs), peer to peer (P2P), vehicle to vehicle (V2V), and vehicle to infrastructure and infrastructure to vehicle (V2I, I2V) networks, among others and as described and contemplated elsewhere herein.

In further examples without limitation, VSC 140, VCS 145, and/or other controllers, devices, and processors, may include, be coupled to, be configured with, and/or cooperate with one or more integrally included, embedded, and/or independently arranged bidirectional communications, navigation, and other systems, controllers, and/or sensors, such as a vehicle to vehicle communications system (V2V) 155, and vehicle to roadway infrastructure to vehicle communication system (V2I, I2V) 160, a LIDAR/SONAR (light and/or sound detection and ranging) and/or video camera roadway proximity imaging and obstacle sensor system 165, a GPS or global positioning system 170, and a navigation and moving map display and sensor system 175, among others.

VCS 145 can cooperate in parallel, in series, and distributively with VSC 140 and such steering wheel controls and buttons and other controllers, subsystems, and internal and external systems to manage and control vehicle 100, external devices, and such other controllers, and/or actuators, in response to sensor and communication signals, data, parameters, and other information identified, established by, communicated to, and received from these vehicle systems, controllers, and components, as well as other off-board systems that are external and/or remote to vehicle 100.

Such bidirectional V2V 155 and V2I 160 (sometimes also referred to herein collectively as V2X) communications controllers and systems enable peer to peer, vehicle to vehicle, and vehicle to infrastructure ad hoc and similar types of networks and communications, utilizing various industry protocols, standards, and/or messaging formats that available in the United States and other countries. Such protocols, standards, and/or messaging formats are utilized for purposes of enabling various aspects of the disclosure and are known to those having knowledge in the relevant technology.

A number of international standards organizations are also involved in the field of technology and have generated various V2X resources such as the Society of Automotive Engineers International.™. (SAE) telematics and related standards include for example SAE standard J2735: entitled "Dedicated Short Range Communications (DSRC) Message Set Dictionary Standard," SAE J2735_201603, available from standards.sae.org/j2735_201603, and others available from topics.sae.org/telematics/standards/automotive. The communications and messaging capabilities for V2X and other applications are defined in, among other references, SAE J2735 as the Basic Safety Message(s) (BSMs, BSM-II) parts 1 and 2.

The disclosure recites BSM and BSM-II messaging capabilities interchangeably and contemplates that extended data and information capabilities enabled by the BSM-II standards are referred to in every instance herein where BSM is recited. The SAE 2735 BSM capabilities support and enable wireless communication between vehicles and/or between vehicles (V2V) and with fixed or nomadic devices, including roadway, intersection, and other infrastructure devices and systems (V2I). The SAE J2735 standard describes, defines, and specifies messages and data elements that make up messages/dialogs specifically for use by vehicle, infrastructure, and other off-board applications that utilize 5.9 gigahertz (GHz) DSRC for Wireless Access in Vehicular Environments (WAVE) communications systems.

The SAE J2945 standard describes communication performance requirements of the DSRC Message sets and the BSM data elements that support V2V and V2I safety applications. Such WAVE communications and related systems are described in more detail in various standards and reports established by and available from the Institute of Electrical and Electronics Engineers (IEEE) as described below. See, for example, standards.ieee.org, and more specifically, IEEE standard 1609, entitled, "Guide for Wireless Access in Vehicular Environments (WAVE) Architecture," which is available from standards.ieee.org/develop/wg/1609_WG.html.

In one example, IEEE 1609 WAVE standards enable and define an architecture and a standardized set of communications services and interfaces that enable secure V2V and V2I wireless communications. These standards enable a range of transportation and navigation applications, including vehicle safety, automated tolling, enhanced navigation, and traffic management, among others. The IEEE 1609 Wave capabilities are utilized in conjunction with others directed to various aspects of network and communications standards and architectures, including those managed by the IEEE 802 local area network and metropolitan area network (LAN/MAN) standards committee, which can be found at www.ieee802.org, as well as standards.ieee.org.

In another example, IEEE Standards 802.11 support software and firmware communications services of IEEE 1609, and enable data link media access control (MAC) and physical layer (PHY) capabilities, such as wireless local area network (WLAN) data communications in various frequency bands. The 802.11 standard is entitled "IEEE Standard for Information technology—Telecommunications and information exchange between systems—Local and metropolitan area networks—Specific requirements Part 11: Wireless LAN Medium Access Control (MAC) and Physical Layer (PHY) Specifications," and is available at ieeexplore.ieee.org/document/7792308.

While illustrated here for purposes of example, as discrete, individual controllers, PCM/MCM/BCM 135, VSC 140 and VCS 145, and the other contemplated controllers, subsystems, and systems, may control, be controlled by, communicate signals to and from, and exchange data with other controllers, and other sensors, actuators, signals, and components, which are part of the larger vehicle and control systems, external control systems, and internal and external networks, components, subsystems, and systems.

The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers, components, subsystems, and systems, both in the singular and plural connotations, and individually, collectively, and in various suitable cooperative and distributed combinations.

Further, communications over CAN 150 and other internal and external PANs, LANs, and/or WANs, are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, PCM/MCM/BCM 135, VSC 140, VCS 145, CAN 150, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off.

Computer-readable storage devices or media may be implemented using any of a number of known persistent and non-persistent memory devices such as PROMs (programmable read-only memory), EPROMs (electrically PROM), EEPROMs (electrically erasable PROM), hard disk drives (HDDs), solid state drives (SSDs), flash memory, or any other electric, magnetic, optical, or combination memory devices capable of storing and communicating data.

Each of such devices, components, processors, microprocessors, controllers, microcontrollers, memories, storage devices, and/or media may also further contain, include, and/or be embedded with one or more basic input and output systems (BIOSs), operating systems, application programming interfaces (APIs) having, enabling, and/or implementing remote procedure call (RPCs), and related firmware, microcode, software, logic instructions, commands, and the like, which enable programming, customization, coding, and configuration, and which may be embedded and/or contained in at least one of and/or distributed across one or more such devices, among other capabilities.

In this arrangement, VSC 140 and VCS 145 cooperatively manage and control the vehicle components and other controllers, sensors, and actuators, including for example without limitation, PCM/MCM/BCM 135, an engine control unit (ECU) 185, and/or various others. For example, the controllers may establish bidirectional communications with such internal and external sources, and communicate control commands, logic, and instructions and code, data, information, and signals to and/or from engine 115, EM 120, batteries 130, ECU 185, and PCM/MCM/BCM/power electronics 135, and other internal and external components, devices, subsystems, and systems. The controllers also may control and communicate with other vehicle components known to those skilled in the art, even though not shown in the figures.

The embodiments of vehicle 100 in FIG. 1 also depict exemplary sensors and actuators in communication with wired and/or wireless vehicle networks and CAN 150 (PANs, LANs) that can bidirectionally transmit and receive data, commands, and/or signals to and from VSC 140, VCS 145, and other controllers. Such control commands, logic, and instructions and code, data, information, signals, settings, and parameters, including driver preferred settings and preferences, may be captured and stored in, and communicated from a repository of driver controls, preferences, and profiles of repository 180, as well as memory and data storage of the other controller(s).

As described and illustrated in the various figures, including FIGS. 1 and 2, the signals and data, including for example, commands, information, settings, parameters, control logic and executable instructions, and other signals and data, can also include other signals (OS) 190, and control or command signals (CS) 190 received from and sent to and between controllers and vehicle components and systems, either over wired and/or wireless data and signaling connections. OS 190, and CS 195, and other signals, related control logic and executable instructions, parameters, and data can and/or may be predicted, generated, established, received, communicated, to, from, and between any of the vehicle controllers, sensors, actuators, components, and internal, external, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIG. 1 and other figures, and by schematically represented data communication lines and signals and wireless signals and data connections. Such diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

FIG. 1 also schematically depicts for continuing illustration purposes but not for purposes of limitation, an example configuration and block topology for VCS 145 for vehicle 100 and its contemplated controllers, devices, components, subsystems, and/or systems. The disclosure is directed to the HMIs including the hardware and software switches and controls (HSCs) 195, which further refer to, incorporate, and include buttons, and/or switches, and steering wheel controls and buttons (SWCs), instrument cluster and panel hardware and software buttons and switches, and GUI display software switches and controls, among other controls In additional exemplary arrangements, the various controllers, such as for example VCS 145, include(s) and/or may include in some arrangements, at least one and/or one or more human machine interfaces (HMIs)/graphical user interface(s) and visual display(s) (GUIs, HMIs) 200 that may be located in a cabin of vehicle 100. HMIs/GUIs 200 may also be coupled and cooperate with automated speech recognition and speech synthesis subsystems, as well as with additional hardware and software controls, buttons, and/or switches, which are incorporated, included, and/or displayed on, about, and/or as part of HMI/GUI 200 and instrument clusters and panels of vehicle 100.

Such controls, buttons, and/or switches may be integrated with HMIs/GUIs 200, as well as with other vehicle devices and systems that may include, for further examples and illustrations, a steering wheel and related components, vehicle dashboard panels and instrument clusters, and the like. For added purposes of example without limitation, VCS 145 may include and/or incorporate persistent memory and/or storage HDDs, SSDs, ROMs 205, and non-persistent or persistent RAM/NVRAM/EPROM 210, and/or similarly configured persistent and non-persistent memory and storage components.

VCS 145 and/or other controller(s), in illustrative but non-limiting examples, also include, incorporate, and/or are coupled to one or more vehicle-based bidirectional data input, output, and/or communications and related devices and components, which enable communication with users, drivers, and occupants of vehicle 100, as well as with external proximate and remote devices, networks (CAN 150, PANs, LANs, WANs), and/or systems. The phrases "vehicle-based" and "onboard" refer to devices, subsystems, systems, and components integrated into, incorporated about, coupled to, and/or carried within vehicle 100 and its various controllers, subsystems, systems, devices, and/or components. In contrast, the phrase "offboard" is directed and contemplates such controllers, subsystems, systems, devices, and/or components being located external to and/or remote from vehicle 100.

For additional examples, VCS 145, GUIs 200, and other controllers of vehicle 100, may include, incorporate, be paired to, synchronized with, and/or be coupled with vehicle-based multimedia devices 215, auxiliary input(s) 220 and analog/digital (A/D) circuits 225, universal serial bus port(s) (USBs) 230, near field communication transceivers (NFCs) 235, wireless routers and/or transceivers (WRTs) 240, such as "Bluetooth™" devices, that enable wireless personal and local area networks (WPANs, WLANs) or "WiFi" IEEE 802.11 and 803.11 communications standards.

The controller(s) and devices(s) of vehicle 100 are also coupled with, incorporate, and/or include analog and digital cellular network modems and transceivers (CMTs) 245 utilizing voice/audio and data encoding and technologies that include for example, those managed by the International Telecommunications Union (nu) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

Such contemplated onboard and offboard devices and components, among others, are configured to enable bidirectional wired and wireless communications between components and systems of vehicle 100, CAN 150, and other external devices and systems and PANs, LANs, and WANs. A/D circuit(s) 225 is/are configured to enable analog-to-digital and digital-to-analog signal conversions. Auxiliary inputs 220 and USBs 230, among other devices and components, may also enable in some configurations wired and wireless Ethernet, onboard diagnostic (OBD, OBD II), free-space optical communication such as Infrared (IR) Data Association (IrDA) and non-standardized consumer IR data communication protocols, IEEE 1394 (FireWire™ (Apple Corp.), LINK.™. (Sony), Lynx.™. (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 220 and A/D circuits 225, USBs 230, NFCs 235, WRTs 240, and/or CMTs 245, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 150, VCS 145, and other controllers and networks of vehicle 100. Auxiliary inputs 220, A/D circuits 225, USBs 230, NFCs 235, WRTs 240, and/or CMTs 245, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices are contemplated to be integrated with, coupled to, and/or connectable to, auxiliary inputs 220, A/D circuits 225, USBs 230, NFCs 235, WRTs 240, and/or CMTs 245, as well as to the other contemplated controller(s) and wired and wireless networks internal to vehicle 100, and in some circumstances external to vehicle 100. For example, the one or more input and output devices include microphones 250, voice processing and recognition devices and subsystems 255, speaker(s) 260, additional display(s) 265, camera(s) 270, nomadic and mobile devices (NMDs) 275, among others, which each include at least one and/or one or more integrated signaling and communications antennas and/or transceivers (AT).

Such input and output devices are and/or may be selectable, connectable, synchronized with, paired to, and/or actuatable with an input selector that may be any of HSCs 195, and may also include, incorporate, and/or be integrated with and/or as part of GUI 200 and the contemplated hardware and software SWCs, controls, buttons, and/or switches 195. Such HSCs 195, as already noted, may be hardware or software or combinations thereof and may be configurable utilizing one or more predetermined, default, and adjustable factory and/or driver controls, profiles, and/or preferences 180.

The contemplated microphones 250, voice processing and recognition devices and subsystems 255, speaker(s) 260, additional display(s) 265, camera(s) 270, NMDs 275, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC speakers and stereo devices and players, portable GPS devices, and similar devices and components that each may include integrated transceivers and antennas AT, wired and plugged data connectors DC, and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections (DCs) and wired and wireless signals and signaling and data communications and streams WSs, with external near and far nomadic, portable, and/or mobile devices 275, networks, and systems (V2X) that may include, for example, infrastructure communications systems (V2I) such as hotspots and wireless access points (HS/WAPs), nano and micro and regular cellular access points and towers (CT), external routers (XRs), and related and accessible external, remote servers, networks, and/or systems.

With continuing reference to FIGS. 1 and 2, it may be understood by those with knowledge in the relevant fields of technology that the disclosure contemplates vehicle 100 to include at least one and/or one or more controller(s) such as VSC 140, VCS 145, and others coupled with an in-vehicle or onboard transceiver AT, such as those described in connection with USBs 230, NFCs 235, WRTs 240, and/or CMTs 245. Although types of wireless transceivers are described and contemplated for use by the disclosure, the disclosure also is directed vehicle communications utilizing nearby and remote legacy devices known to some having skill in the related technologies.

Such legacy devices have in recent years seen advances to include wireless configurations, and can include for further examples, what are referred to by some in the field of art as vehicle gateway and engineering and connectivity service tools (VGs, ESTs, CSTs). The controller(s) 140, 145 and transceiver(s) AT are configured to detect WSs and connect to nearby or proximate or far wired and wireless network devices having in-range WSs, as well as third-party, off-board, external devices such as nomadic, portable, and/or mobile or nomadic mobile devices 275.

Vehicle 100 also includes the various in-vehicle and/or onboard controller(s) such as VSC 140, VCS 145, and others coupled to, in communication with, to include, and/or be configured with the variously described wired and/or wireless transceivers and network communication devices being configured to connect with and/or communicate with the remote server and/or servers (FIG. 1). The in-vehicle and/or onboard controller(s) are configured to respond to a remote software update message (RSUM) for vehicle 100, which is received from the remote server(s).

RSUM may be generated by and received from the remote server via any of the communications capabilities already described. RSUM may be configured as and/or be part of the contemplated BSMs described elsewhere herein, a message format compatible for use with OBD II messaging formats such as ePIDs (electronic parameter identifiers), as well as V2I and I2V open source messaging formats configured for use with and implemented by various original equipment manufacturers (OEMs), such as for purposes of example but not for purposes of limitation, SmartLinkDevice (SDL), OpenXC, and SYNC.™. AppLink.™., among others.

RSUM may include one or more software update related data elements, including for example purposes without limitation, a vehicle identification number (VIN), a software update release notification (SRD), a software version request (SVR), a software version list (SVL), a software update authentication data (SAD), and/or other elements. While described here for purposes of example, such update related data elements may be included as separate data elements and/or combined as part of a single data element, such as BSMs, OBD II compatible messages, and others types of open source and/or OEM compatible messaging formats.

In typical applications, the VIN may include only some and/or a portion of the standardized 17-digit unique vehicle identifiers issues by OEMs, and may only include the three character manufacturer identifier, the 5-character vehicle descriptor, the descriptor check digit, the year digit, and assembly plant, and may exclude the remaining 6-digit production number. This arrangement enables the RSUM to be utilized for fleets of vehicles 100 that may require an update, without the need for additional identification data. In other arrangements, a VIN range may be included such that each recipient vehicle, onboard controller may detect whether the RSUM is applicable or may be disregarded.

The SRD of the disclosure is configured to include update related data that an OEM may require, to enable and notify automated vehicle software update systems of a newly released update, and to enable such updates of onboard vehicle software for a particular controller(s) and/or onboard computer processing and computing system. Such SRDs may include serial numbers, hardware part numbers, manufacture dates, and similar types of data, which vehicle software update systems may require, to detect whether various vehicle controller(s) and computing systems are compatible for use with and/or require such software updates.

The SVR may enable the remote server(s) to poll vehicle fleets to determine what versions of specific software are installed in individual vehicles 100 that are deployed about a factory or assembly plant, and/or which are in possession of customers and users. In one exemplary variation, SVR incorporates a request from the remote server(s) that commands vehicle 100 to reply with a list of current, installed software versions for the onboard controller(s) and computing systems.

The SVL transmitted from the remote server(s) will in one example incorporate a list of the most current software versions available on the remote server(s), which enables recipient vehicles 100 to detect whether software updates are available from remote server(s) and/or required. In another example, the SVL may be transmitted to the remote server(s) from vehicles 100, to enable the remote server(s) to detect whether the source vehicles 100 may require software updates. The SAD includes, for purposes of further examples, checksums, cryptologic keys, and related information, which enables vehicles 100 to verify error-free receipt of software updates downloaded from the remote server(s). SADs can also be configured to further enable verification of successful installation and flashing of such updates to the controller(s) and computing systems of vehicles 100. Detected errors may be recorded in profiles 180 and/or communicated to one or more of remote server(s), HMI/GUI 200 of vehicle 100, and/or NMDs 275, among others.

The in-vehicle and/or onboard controller(s) are also configured to respond to the RSUM, and to detect whether a software update is required and/or compatible according to one or more of the SRD, SVL, and/or SAD updated related data. For required and compatible software updates identified thereby, the controller(s) of vehicle 100 are configured to also download a software update from the remote server(s) to vehicle 100. Once download is completed, in added variations, the controller(s) verify error free download utilizing the SAD and/or other update related data elements.

The onboard controller(s) are modified to detect a current operational state of vehicle 100 to determine whether the vehicle 100 is in an active and in-use state, and/or in an idle, unused state such that it is available to perform software updates to the vehicle controller(s) and computing systems. Such an idle state will include vehicle 100 and its drivetrain and components and systems being unpowered and non-operational. In response to detecting the idle state of vehicle 100, the controller(s) is/are modified to automatically configure vehicle 100 from the idle state, to a program mode the prevents use until the program mode is terminated, such that the software update can be initiated and completed.

The program mode configuration includes, establishes, and/or commands, for purposes of further illustration without limitation, automatically and electronically configuration of a vehicle ignition/propulsion/drive train electronic key state to be in an on condition (KON), the drive train and/or transmission to be in a park condition (PKC), and the internal combustion engine and/or EM to be in the off condition (EOF). Additional systems and components of vehicle 100 may also be configured as may be appropriate for the program mode, so that the software update may be performed without interruption and without interference from controller(s) and computing systems of vehicle 100 during the software update process.

For further example, if the software updates include an updated software configuration for an in-vehicle controller that is tasked with performing the software updates for vehicle 100, then that onboard controller may task a different onboard controller, and/or may relinquish update control temporarily and instantiate an independent process running on another onboard controller, to perform the required update, and update verification. Consequently, the program mode may require controller task sharing and/or reassignment to another of the in-vehicle controller(s) to establish the program configuration, such that the software update can be performed on any such in-vehicle controller(s) and processing and computing systems.

If the onboard controller(s) of vehicle 100 successfully configure the program mode, then the controller(s) commence the software update and/or flash of one or more vehicle controller(s), which may include the already described vehicle controller(s), as well as the other various vehicle components, devices, and/or processing and computing systems. Upon completion of the software update and/or updates to the or more controller(s), components, devices, and/or processing and computing systems of vehicle 100, the in-vehicle controller(s) performing the software update also are configured to verify the update or updates, and upon verification of successful update(s), to terminate the program mode by reverting the vehicle 100 to its prior idle, unused state, by for example without limitation, commanding KOF, EOF, and/or PK, and/or another set of such conditions according to such prior state of vehicle 100 before the program mode configuration.

The disclosure also contemplates the in-vehicle controller(s) configured to periodically connect to the remote server(s) and/or to respond to periodic connection requests received therefrom, to receive the RSUM or other data from the remote server(s) and/or to transmit a software revision list thereto. In variations of the controller(s) of vehicle 100, in response to receiving the SVR from the remote server(s) either separately and/or as part of the BSM embedded with the RSUM and/or separately received RSUM, the controller(s) are also configured to generate a reply to the server that includes the SVL. If the remote server(s) detect from the SVL that a software update is required by vehicle 100, then the software update is downloaded by vehicle 100 controller(s), and another RSUM is transmitted to and received by the vehicle controller(s), which includes the SAD as already described.

If the download verification fails according to the SAD, the controller(s) are further modified to redownload the software update, and in response to successful verification, to configure the vehicle to the program mode. As with other variations, detected failures or errors, update status, and related update data may also be communicated to one or more of remote server(s), HMI/GUI 200 of vehicle 100, and/or NMDs 275 that may be in communication with vehicle 100 directly or through a connection to remote server(s).

The vehicle 100 also includes the onboard controller(s) configured to enable scheduling of the software update(s) during predetermined times and dates, such that updates and update software downloads only occur according to a specified schedule. This enables managers of factory manufacturing inventories and post-sale operational user vehicle fleets to ensure uninterrupted vehicle availability, except during such specified scheduled times. For example, the controller(s) of vehicle 100 are further modified to periodically detect and compare a current time to a predetermined update schedule (PS), which schedule includes one or more individual and/or recurring times and dates when vehicle 100 is available to perform automated software update related tasks.

When such a current time is detected to be within the PS, the onboard controller(s) are modified to configure the vehicle to the program mode. However, if the in-vehicle controller(s) detect unavailability of vehicle 100 for updating, because the detected time is outside the PS, the controller(s) are further adapted to monitor the current until detecting it to be within the update schedule. Further, the controller(s) are also configured in variations to pause one or more of the program mode configuration, download of the software update, and/or flash and update of the software, until the detected time is within the schedule. Instead, the controller(s) of vehicle 100 are also modified in some arrangements to generate a pending update message, which may be communicated to one or more of the HMI or GUI 200 and/or the remote server(s).

The vehicle 100 of the disclosure includes the in-vehicle controller(s) also coupled with the one or more batteries 130, and may include for example PCM/MCM/BCM and power electronics controller(s) 135, and/or ECU 185, which are further configured to monitor and/or detect a state of charge (SoC) of battery(ies) 130 that exceeds a flash charge limit (FCL). The FCL is a SoC limit that is calibrated to establish the amount of energy that must be available in the battery(ies) 130 to enable successful completion of the contemplated software update. When SoC is at or below the FCL, there may be a probability that enough energy does not remain in battery(ies) 130 to enable successful completion of the software update. The controller(s) are modified in this arrangement to configure vehicle 100 to the program mode, when the detected SoC exceeds the FCL.

In further variations of the disclosure, the onboard controller(s) are also configured to recharge battery(ies) 130 when the SoC is at and/or below FCL. For example, responsive to detecting the state of charge (SoC) not exceeding FCL, the controller(s) may also detect whether vehicle 100 is configured to enable unattended and/or automated charging of battery(ies) 130. Vehicle 100 and/or the controller(s) may include a recharge permission (RP), which is stored as part of the controls, preferences, and profiles 180.

RP is configured to enable or disable automated battery charging in response to a software update according to factory and/or user preferences and/or requirements. In some arrangements according to the disclosure, RP may be obtained from an NMD 275 that may be in communication with vehicle 100 either automatically and/or by an automated request from vehicle 100 controller(s) to the NMD 275, which may require a user authorization with RP otherwise disables automated, unattended battery charging.

If the in-vehicle controller(s) of vehicle 100 detect that RP enables automated battery charging, then such controller(s) are further modified in some variations to automatically configure vehicle 100 to the program mode, and to have an engine on condition (EON), such that battery(ies) 130 is/are recharged for a predetermined amount of time and/or until SoC exceeds the FCL. In one example, the battery(ies) 130 may be recharged for about 15 or 30 minutes, and in other variations, until SoC exceeds FCL. Once the SoC exceeds FCL, then the controller(s) are configured to have the EOF, and the controller(s) proceed with the contemplated software update as described elsewhere herein.

In other adaptations of the disclosure, the onboard controller(s) are also configured to communicate an update status (STAT) to one or more of the remote server(s), NMDs 275, and/or vehicle 100 via HMI or GUI 200 and/or to store an historical log of such updates in profiles 180 and/or another repository of vehicle 100. The STAT is configured to be sent in response to and to include one or more of update verification, confirmation of termination of the program mode, KOF, and other update related data.

In further variations of the disclosure, the onboard controller(s) of vehicle 100 are also coupled to the HMI and/or GUI 200, and further configured to generate and communicate to the remote server(s), an update inquiry in response to an input from HMI/GUI 200 and/or NMDs 275 in communication with vehicle 100. Such an update inquiry enables a technician and/or user of vehicle 100 to poll the remote server(s) to detect whether software updates are available. The vehicle controller(s) then are also enabled to receive in response, RSUM, and related software update data, for vehicle 100, such the software update may proceed as already described.

In another arrangement, the in-vehicle controller(s) are also configured to respond to a vehicle and/or user interaction signal or signals received by the controller(s) while vehicle 100 is in the program mode and a software update is in progress. Such interaction signal(s) may include detection of a door open, an electronic door lock/unlock signal, and/or actuation of any other vehicle component, device, and/or system by a user. In response, the in-vehicle controller(s) are also configured in some variations to generate a program mode alert message, to one or more of HMI/GUI 200, and/or an audiovisual alert to annunciate the configured program mode. The audiovisual alert is communicated to at least one of HMI/GUI 200, displays 265, and/or headlamps, turn signals, instrument cluster lights, an external vehicle horn, vehicle voice system and/or speaker 255, 260 and/or other audiovisual devices of vehicle 100.

With continuing reference to FIG. 1, and now also to FIG. 2, those knowledgeable in the technology of the disclosure may also understand that the described arrangements, modifications, and variations also include and are directed to methods of operation, which utilize one or more of the various controllers and processing and computing systems, and other components, devices, and systems of vehicle 100 described elsewhere herein, which are now referenced generally in FIG. 2 as controller(s) 300. While various method steps are recited in FIG. 2 in a depicted order or sequence, such an illustration is for example purposes only, and should not be construed to require a certain order or sequence or other limitation.

For additional examples, a method of controlling vehicle 100 starts at step 305, and includes at step 310, periodically connecting to remote server(s), and at step 315 detecting updated software on the remote server(s). As described elsewhere herein, updated software on the remote server(s) is detected by one or more of receiving the RSUM, SRD, and/or SVR, and in response either replying with the SVL and/or receiving an updated SVL, such that one or both, of the remote server(s) and/or vehicle 100 controller(s), are able to detect whether compatible and updated software is available from the remote server(s). In response, the methods of controller(s) and processing and computing systems 300 further include downloading at step 320, such updated software to vehicle 100, as well as SADs that enable verification and decryption of the updated software received from the remote server(s) as already described. If verification utilizing the SAD confirms at step 325, the update software was downloaded error-free, then the methods of controller(s) 300 pass control to step 330.

Responsive to detecting at step 330, an idle state of vehicle 100, the methods of the controller(s) 300 further incorporate at step 335, detecting whether a current time is within predetermined schedule PS, and if so then at step 340, detecting if SoC of battery(ies) 130 exceed the FCL. If SoC of the battery(ies) 130 is less than or equal to FCL, then control passes to step 345 and the methods of controller(s) 300 detect whether RP enables unattended, automated battery charging. If not then control returns to start step 305, and STAT message may be communicated to remote servers and/or vehicle HMI/GUI 200 that an update is pending. If RP enables automated and unattended battery charging, then control passes to step 350 to enable EON until battery(ies) 130 are recharged.

Once SoC is greater than FCL at step 340, then the methods of controller(s) 300 proceed to step 355 and include configuring vehicle 100 into the program mode with KON, PK, and EOF. The method also includes at step 360 updating and/or flashing the software updates to the controller(s) and processing and computing systems 300, and when complete, commanding KOF at step 365. Thereafter, control returns to start step 305, and the methods of the controller(s) and processing and computing systems 300 continue monitoring for further software updates.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
an onboard controller configured to:
responsive to receiving a remote software update message for a vehicle, download a software update to the vehicle from a remote server; and
responsive to detecting a vehicle not in use state,
automatically configure the vehicle to a programt mode including key on, park, and engine off conditions,
flash and verify the update to one or more vehicle controllers, and
terminate the first mode and command a key off condition.

2. The vehicle according to claim 1, comprising:
the onboard controller coupled to a networked communications device, and further configured to:
connect periodically to the remote server, and
responsive to receiving a software version request from the server, generate a reply to the server including a software version list, and receive the remote software update message including software update authentication data.

3. The vehicle according to claim 1, comprising:

the onboard controller coupled to a wireless transceiver and in communication with the remote server, and further configured to:

in response to a software version list transmitted to the server, receive the remote software update message including software update authentication data, and verify the downloaded software update according to the authentication data, and in response to a failed verification, redownload the software update, and in response to successful verification, automatically configure the vehicle to the program mode.

4. The vehicle according to claim 1, comprising:

the onboard controller further configured to:

responsive to detecting a current time to be within a predetermined update schedule, automatically configure the vehicle to the program mode, and responsive to detecting unavailability, generating a pending update message.

5. The vehicle according to claim 1, comprising:

the onboard controller further configured to:

responsive to detecting a current time to be within a predetermined update schedule, automatically configure the vehicle to the program mode, and responsive to detecting unavailability, monitor a current time until detecting a time within the predetermined update schedule.

6. The vehicle according to claim 1, comprising:

the onboard controller coupled to a battery, and further configured to:

responsive to detecting a battery state of charge exceeding a flash charge limit, automatically configure the vehicle to the programt mode.

7. The vehicle according to claim 6, comprising:

the onboard controller further configured to:

responsive to detecting a recharge permission and the state of charge (SoC) not exceeding the limit, automatically configure the vehicle to the program mode with an engine on condition, such that the battery is recharged until the SoC exceeds the flash charge limit.

8. The vehicle according to claim 1, comprising:

the onboard controller further configured to:

responsive to verification of the update and termination of the program mode, communicate an update status to one or more of the remote server and the vehicle.

9. The vehicle according to claim 1, comprising:

the onboard controller coupled to a graphical user interface, and further configured to:

generate and communicate to the remote server an update inquiry in response to an input from the graphical user interface, and receive in response, the remote software update message for the vehicle.

10. The vehicle according to claim 1, comprising:

the onboard controller coupled to a graphical user interface, and further configured to:

in response to a vehicle/user interaction signal received by the controller, generate at least one of a program mode alert message to the graphical user interface and an audiovisual alert to annunciate the configured program mode.

11. A vehicle, comprising:

an onboard controller coupled to a wireless transceiver and configured to:

responsive to detecting updated software on a remote server, download the software to the vehicle; and responsive to detecting an unused and unattended state during a predetermined time, automatically configure the vehicle with key on, park, and engine off conditions, flash the software to at least one vehicle controller, and automatically command a key off condition.

12. The vehicle according to claim 11, comprising:

the onboard controller further configured to:

connect periodically to the remote server, and responsive to receiving a software version request from the server, generate a reply to the server including a software version list, and download the software with update authentication data.

13. The vehicle according to claim 11, comprising:

the onboard controller further configured to communicate with the remote server, and to:

in response to a software version list transmitted to the server, download the updated software and update authentication data, and verify the downloaded software update according to the authentication data, and in response to a failed verification, redownload the updated software, and in response to successful verification, automatically configure the vehicle with the key off condition.

14. The vehicle according to claim 11, comprising:

the onboard controller coupled to a battery, and further configured to:

responsive to detecting a battery state of charge exceeding a flash charge limit, automatically configure the vehicle with the key on, park, and engine off conditions.

15. The vehicle according to claim 11, comprising:

the onboard controller further coupled to a battery and configured to:

responsive to detecting a recharge permission and a state of charge (SoC) not exceeding a flash charge limit, automatically configure the vehicle with an engine on condition, such that the battery is recharged until the SoC exceeds the limit.

16. A method of controlling a vehicle, comprising:

by an onboard controller coupled to a wireless transceiver, responsive to detecting updated software on a remote server, downloading the software to the vehicle; and responsive to detecting an unattended and unused vehicle state, automatically configuring the vehicle with key on, park, and engine off conditions, flashing the software to at least one vehicle controller, and commanding a key off condition.

17. The method according to claim 16, comprising:
by the onboard controller,
connecting periodically to the remote server, and
responsive to receiving a software version request from the server,
- generating a reply to the server including a software version list, and
- downloading the software with update authentication data.

18. The method according to claim 16, further comprising:
by the onboard controller further configured to communicate with the remote server,
in response to transmitting a software version list to the server,
- downloading the updated software and update authentication data, and
- verifying the downloaded software update according to the authentication data, and
in response to a failed verification,
- redownloading the updated software, and
in response to successful verification,
- automatically configuring the vehicle with the key off condition.

19. The method according to claim 16, comprising:
by the onboard controller coupled to a battery,
responsive to detecting a battery state of charge exceeding a flash charge limit,
- automatically configuring the vehicle with the key on, park, and engine off conditions.

20. The method according to claim 16, further comprising:
by the onboard controller coupled to a battery and further configured to:
responsive to detecting a recharge permission and a state of charge (SoC) not exceeding a flash charge limit,
- automatically configure the vehicle with an engine on condition,
  - such that the battery is recharged until the SoC exceeds the limit.

* * * * *